US012567993B2

(12) United States Patent (10) Patent No.: US 12,567,993 B2
Yang et al. (45) Date of Patent: Mar. 3, 2026

(54) SYSTEM AND METHOD FOR VERIFYING VIRTUAL ECU FOR AUTOMOTIVE EMBEDDED SYSTEM

(71) Applicant: DRIMAES, INC., Daegu (KR)

(72) Inventors: Anna Yang, Seongnam-si (KR); Woojin Han, Seoul (KR); WooHyun Seol, Seoul (KR); Inho Lee, Seoul (KR); Jisu Kong, Seoul (KR)

(73) Assignee: DRIMAES, INC., Daegu (KR)

( * ) Notice: Subject to any disclaimer, the term of this patent is extended or adjusted under 35 U.S.C. 154(b) by 299 days.

(21) Appl. No.: 18/361,720

(22) Filed: Jul. 28, 2023

(65) Prior Publication Data

US 2025/0007749 A1    Jan. 2, 2025

(30) Foreign Application Priority Data

Jun. 27, 2023    (KR) ........................ 10-2023-0082582

(51) Int. Cl.
*H04L 12/40*        (2006.01)
*H04L 41/14*        (2022.01)
*H04L 43/50*        (2022.01)

(52) U.S. Cl.
CPC ...... *H04L 12/40006* (2013.01); *H04L 41/145* (2013.01); *H04L 43/50* (2013.01); *H04L 2012/40273* (2013.01)

(58) Field of Classification Search
CPC . H04L 12/40006; H04L 41/145; H04L 43/50; H04L 2012/40273
See application file for complete search history.

(56) References Cited

U.S. PATENT DOCUMENTS

| | | | |
|---|---|---|---|
| 2021/0203343 A1* | 7/2021 | Cho ....................... | H03M 1/122 |
| 2021/0306177 A1* | 9/2021 | Fredriksson ...... | H04L 12/40104 |
| 2024/0134628 A1* | 4/2024 | Teraoka .................. | G06F 13/00 |
| 2024/0297807 A1* | 9/2024 | Barman ............ | H04L 12/40078 |

* cited by examiner

*Primary Examiner* — Farley Abad
(74) *Attorney, Agent, or Firm* — BROADVIEW IP LAW, PC

(57) ABSTRACT

A system for verifying a virtual ECU for an automotive embedded system is provided. The system includes a docker management unit configured to perform setting on a plurality of virtual ECUs based on first setting information and to construct a network between the plurality of virtual ECUs based on second setting information and a docker host managed by the docker management unit. The docker host includes a resource management unit including a device driver for each board for generating each virtual ECU and an application builder for building an embedded software-based application according to the AUTOSAR standard to be mounted on the virtual ECU, the plurality of virtual ECUs each configured to drive the built application, and a network management unit connected to the plurality of virtual ECUs and configured to support network communication between the virtual ECUs.

10 Claims, 6 Drawing Sheets

SYSTEM AND METHOD FOR VERIFYING VIRTUAL ECU FOR AUTOMOTIVE EMBEDDED SYSTEM

CROSS-REFERENCE TO RELATED APPLICATION

This application claims priority under 35 U.S.C § 119 to Korean Patent Application No. 10-2023-0082582 filed in the Korean Intellectual Property Office on Jun. 27, 2023, the entire contents of which are hereby incorporated by reference.

BACKGROUND

1. Technical Field

The present disclosure relates to a system and method for verifying a virtual electronic control unit (ECU) for an automotive embedded system.

2. Related Art

FIG. 1 is a diagram for describing a process of verifying multiple ECU networks in a conventional technology.

In general, in an automotive embedded system, tests are performed by connecting the multiple ECUs 103 to one communication line 101 in order to verify the networks of multiple ECUs 103. A network monitor 105 is used as a tool for monitoring a message on a bus. The network monitor 105 may monitor communication between the ECUs 103 in real time, and may check the transmission and reception of messages or data integrity.

FIG. 2 is a diagram for describing a process of verifying multiple ECU networks having different communication protocols in a conventional technology.

In an automotive embedded system, for communication between ECUs 211, 221, and 231 having different communication protocols, after a separate network is constructed for each of communication protocols 210, 220, and 230, information on each bus needs to be individually monitored through each of network monitors 212, 222, and 232.

Even in data conversion, a task, such as transmitting data to a corresponding bus after changing the format of a message based on a protocol through software for the management of a separate network, needs to be performed.

SUMMARY

Various embodiments are directed to a system and method for verifying a virtual ECU for an automotive embedded system, which provide a function for simulating network communication by transmitting a message to a specific bus according to a specific protocol and performing data conversion between different protocols based on messages that need to be exchanged between individual ECUs, the protocol of a corresponding ECU and information on a bus in a structure in which a network management unit and a virtual ECU have been connected in a 1:1 manner.

However, objects of the present disclosure to be achieved are not limited to the aforementioned object, and other objects may be present.

A system for verifying a virtual electronic control unit (ECU) for an automotive embedded system according to a first aspect of the present disclosure includes a docker management unit configured to perform setting on a plurality of virtual ECUs based on first setting information and to construct a network between the plurality of virtual ECUs based on second setting information and a docker host managed by the docker management unit. In this case, the docker host includes a resource management unit including a device driver for each board for generating each virtual ECU and an application builder for building an embedded software-based application according to an AUTOSAR standard to be mounted on the virtual ECU, the plurality of virtual ECUs each configured to drive the built application, and a network management unit connected to the plurality of virtual ECUs and configured to support network communication between the virtual ECUs.

In some embodiments of the present disclosure, the network management unit may include a network configuration unit configured to construct a virtualized network environment for the network communication and to support a homogeneous or heterogeneous network communication protocol upon network communication between the virtual ECUs, and a network monitoring unit configured to verify a virtualized network environment by logging data that are transmitted and received between the plurality of virtual ECUs to which a plurality of network communication protocols has been applied.

In some embodiments of the present disclosure, when receiving data that have been transmitted by a first virtual ECU, the network monitoring unit may confirm the destination of the data through the network configuration unit and transmit the data to a second virtual ECU corresponding to the destination.

In some embodiments of the present disclosure, the network monitoring unit may transmit the data transmitted by the first virtual ECU having a first network communication protocol by converting the data into data corresponding to a second network communication protocol that has been applied to the second virtual ECU based on routing information of the network configuration unit.

In some embodiments of the present disclosure, the network monitoring unit and the virtual ECU may include a functional mockup interface (FMI) for exchanging simulation models performing simulations on a test case.

In some embodiments of the present disclosure, the system may further include a network test unit configured to store and drive the test case for automating a network test between the plurality of virtual ECUs, and an ECU test unit configured to store and drive the test case for automating the verification of each virtual ECU.

In some embodiments of the present disclosure, when receiving simulation information from the network configuration unit and a simulation model from an external commercial tool, the network monitoring unit may generate a message corresponding to a specific input to the simulation model, may transmit the message to the virtual ECU, records a response from the virtual ECU, and may determine whether the recorded response is identical with a response in the test case.

In some embodiments of the present disclosure, the network monitoring unit may return, to the external commercial tool, the results of logging of data that are transmitted and received between the plurality of virtual ECUs in order to determine the propriety of the results of the logging. The external commercial tool may generate the results of the determination of the propriety by comparing the results of the logging and the results of the simulations according to the test case.

In some embodiments of the present disclosure, when receiving a simulation model from an external commercial tool, the network monitoring unit may transmit, to the simulation model, the virtual ECU, that is, a simulation target, based on simulation information and routing information, and may transmit, to the external commercial tool, the results of the simulations received from the virtual ECU, that is, the simulation target, The external commercial tool may generate the results of the determination of the propriety by comparing the results of the simulations with the results of simulations according to the test case.

Furthermore, a method of verifying a virtual electronic control unit (ECU) for an automotive embedded system, which is performed by a virtual ECU verification system including a docker management unit configured to perform setting on a plurality of virtual ECUs based on setting information and to construct a network between the plurality of virtual ECUs and a docker host managed by the docker management unit, according to a second aspect of the present disclosure includes receiving, by a network management unit, data transmitted by a first virtual ECU, confirming, by the network management unit, the destination of the data, confirming, by the network management unit, a network communication protocol that has been applied to a second virtual ECU corresponding to the destination, and transmitting the data to the second virtual ECU by maintaining or changing a format of the data in accordance with the network communication protocol. The network management unit and the virtual ECU are generated based on a container within the docker host.

Furthermore, a computer program according to another aspect of the present disclosure executes the method of verifying a virtual ECU for an automotive embedded system in combination with a computer, that is, hardware, and is stored in a computer-readable recording medium.

Other details of the present disclosure are included in the detailed description and the drawings.

The present disclosure has advantages in that the transmission of a message to a specific bus can be imitated according to a specific protocol based on only a message, a protocol, and information on a bus by connecting the network management unit and the virtual ECU in a 1:1 manner, unlike in a conventional technology in which a new bus is generated by a manual task or separate software is developed, and thus a new bus can be conveniently generated.

Furthermore, although protocols supported by virtual ECUs are different from each other, communication between various protocols can be flexibly processed if the communication is required because a function for changing the format of a received message according to a destination protocol can be integrally performed.

Furthermore, communication management in a complicated network can be simplified because the network management unit monitors all buses and enables the exchange of required data even a situation in which a specific protocol bus is present and an ECU group is connected to each bus.

Furthermore, there are advantages in that communication between multiple buses can be effectively monitored and required data can be exchanged through the network management unit and thus a communication error can be detected and solved and communication efficiency of the entire system can be improved.

Effects of the present disclosure which may be obtained in the present disclosure are not limited to the aforementioned effects, and other effects not described above may be evidently understood by a person having ordinary knowledge in the art to which the present disclosure pertains from the following description.

BRIEF DESCRIPTION OF THE DRAWINGS

FIG. 5 is a diagram for describing an embodiment in which a virtual ECU is verified in an embodiment of the present disclosure.

DETAILED DESCRIPTION

Figure 1:
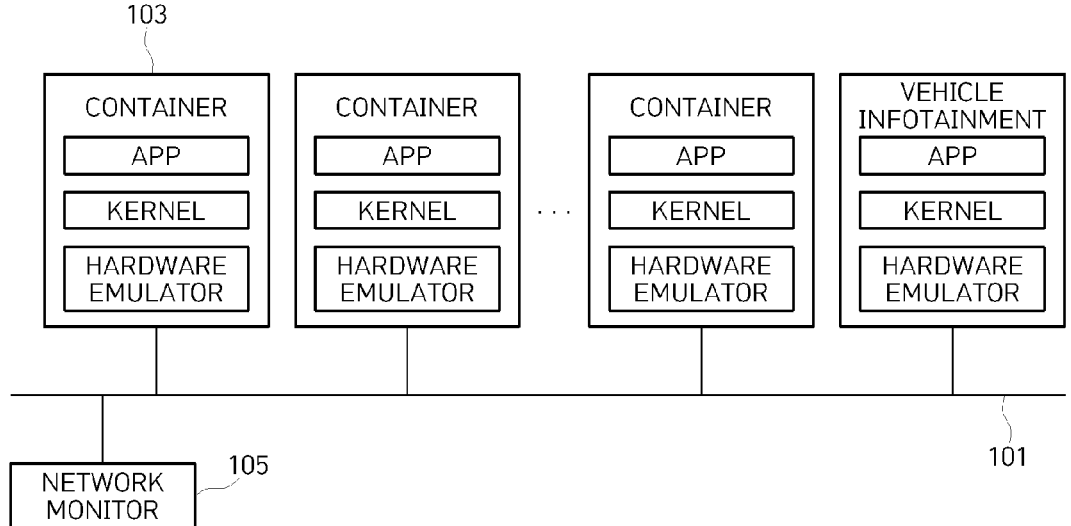
FIG. 1 is a diagram for describing a process of verifying multiple ECU networks in a conventional technology.
Figure 2:
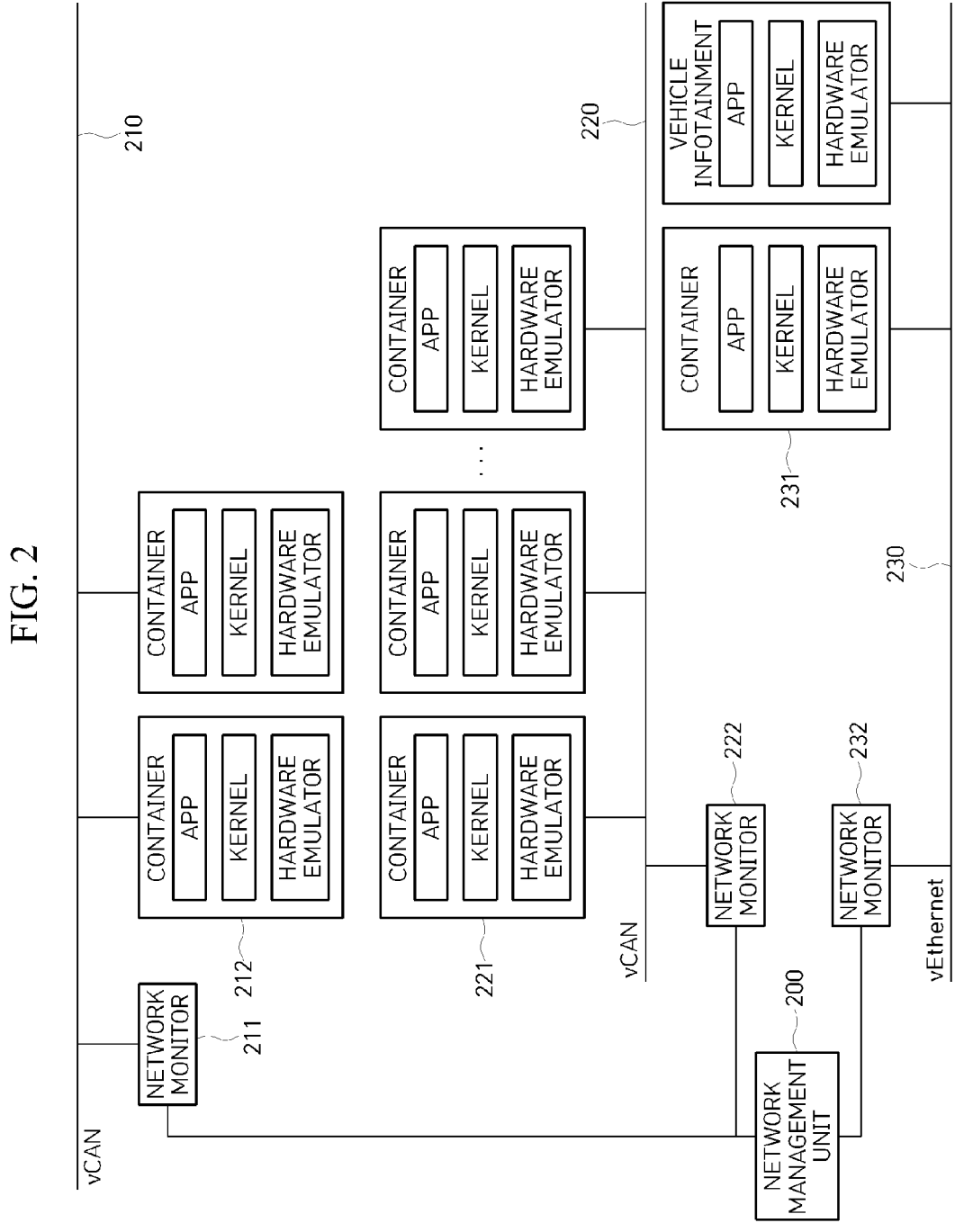
FIG. 2 is a diagram for describing a process of verifying multiple ECU networks having different communication protocols in a conventional technology.

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. "And/or" includes each of mentioned elements and all combinations of one or more of mentioned elements. Although the terms "first", "second", etc. are used to describe various components, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

The present disclosure relates to a system and method for verifying a virtual electronic control unit (ECU) for an automotive embedded system.

According to embodiments of the present disclosure, the transmission of a message to a specific bus can be imitated according to a specific protocol based on only messages to be exchanged between individual virtual ECUs and information on a bus to be connected to the protocol of a corresponding virtual ECU by connecting a network management unit and the virtual ECU in a 1:1 manner without the need to generate a new bus by a manual task or develop separate software. Furthermore, although protocols supported by virtual ECUs are different from each other, a function for changing the format of a received message according to a destination protocol can be integrally performed.

In particular, considering a case in which multiple CAN buses are present and an ECU group is connected to each bus, for example, a situation in which a virtual ECU0 and a virtual ECU1 are connected to a CAN0 bus and a virtual ECU2, a virtual ECU3, and a virtual ECU4 are connected to a CAN1 bus. In such a case, the network management unit monitors all of the CAN buses so that required data can be exchanged between the CAN0 bus and the CAN1 bus.

That is, in an embodiment of the present disclosure, the network management unit provides a function for effectively monitoring communication between multiple CAN buses and enabling required data to be exchanged.

Hereinafter, a system for verifying a virtual ECU for an automotive embedded system (hereinafter referred to as a "virtual ECU verification system") according to an embodiment of the present disclosure is described with reference to FIGS. 3 to 5.

Figure 3:
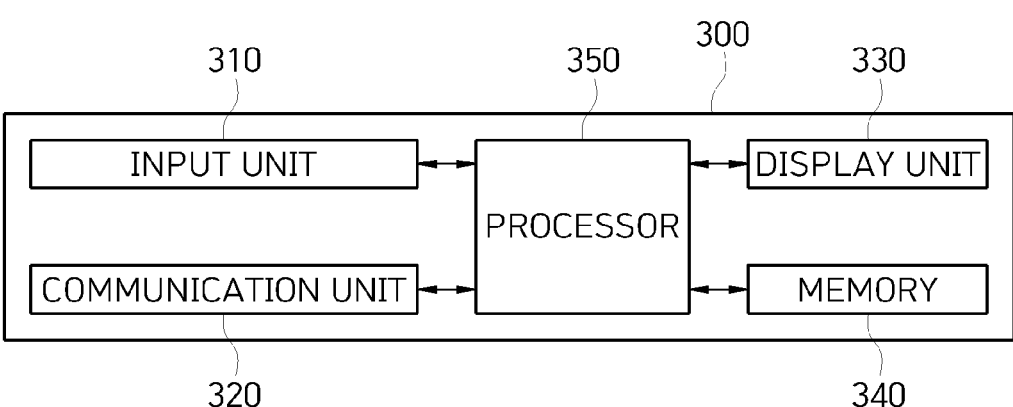
FIG. 3 is a block diagram of a virtual ECU verification system 300 according to an embodiment of the present disclosure.

FIG. 3 is a block diagram of a virtual ECU verification system 300 according to an embodiment of the present disclosure.

Referring to FIG. 3, the virtual ECU verification system 300 includes an input unit 310, a communication unit 320, a display unit 330, memory 340, and a processor 350.

The input unit 310 generates input data in response to a user input to the virtual ECU verification system 300. The input unit 310 includes at least one piece of input means. The input unit 310 may include a key board, a key pad, a dome switch, a touch panel, a touch key, a mouse, and a menu button.

The communication unit 320 supports the transmission and reception of internal data or external data of the virtual ECU verification system 300. The communication unit 320 may include both a wired communication module and a wireless communication module. The wired communication module may be implemented by using a power line communication device, a telephone line communication device, a cable home (MoCA), Ethernet, IEEE1294, an integrated wired home network, or an RS-485 control device. Furthermore, the wireless communication module may be constructed as a module for implementing a function, such as a wireless LAN (WLAN), Bluetooth, HDR WPAN, UWB, ZigBee, Impulse Radio, 60 GHz WPAN, Binary-CDMA, wireless USB technology and wireless HDMI technology, In addition, 5th generation (5G) communication, long term evolution-advanced (LTE-A), long term evolution (LTE), or wireless fidelity (Wi-Fi).

The display unit 330 displays data according to an operation of the virtual ECU verification system 300 and the results of simulations. The display unit 330 includes a liquid crystal display (LCD), a light emitting diode (LED) display, an organic light-emitting diode (OLED) display, a micro electro mechanical systems (MEMS) display, and an electronic paper display. The display unit 330 may be implemented as a touch screen by being combined with the input unit 310.

The memory 340 stores operating programs of the virtual ECU verification system 300. In this specification, the memory 340 commonly refers to a nonvolatile storage device and a volatile storage device that retain information stored therein although power is not supplied to the nonvolatile storage device and the volatile storage device. For example, the memory 120 may include NAND flash memory, such as a compact flash (CF) card, a secure digital (SD) card, a memory stick, a solid-state drive (SSD), and a micro SD card, a magnetic computer memory device, such as a hard disk drive (HDD), and an optical disc drive, such as CD-ROM and DVD-ROM.

The processor 350 may control at least another component (e.g., a hardware or software component) of the electronic device 100 by executing software, such as a program stored in the memory, and may perform various data processing or operations.

Figure 4:
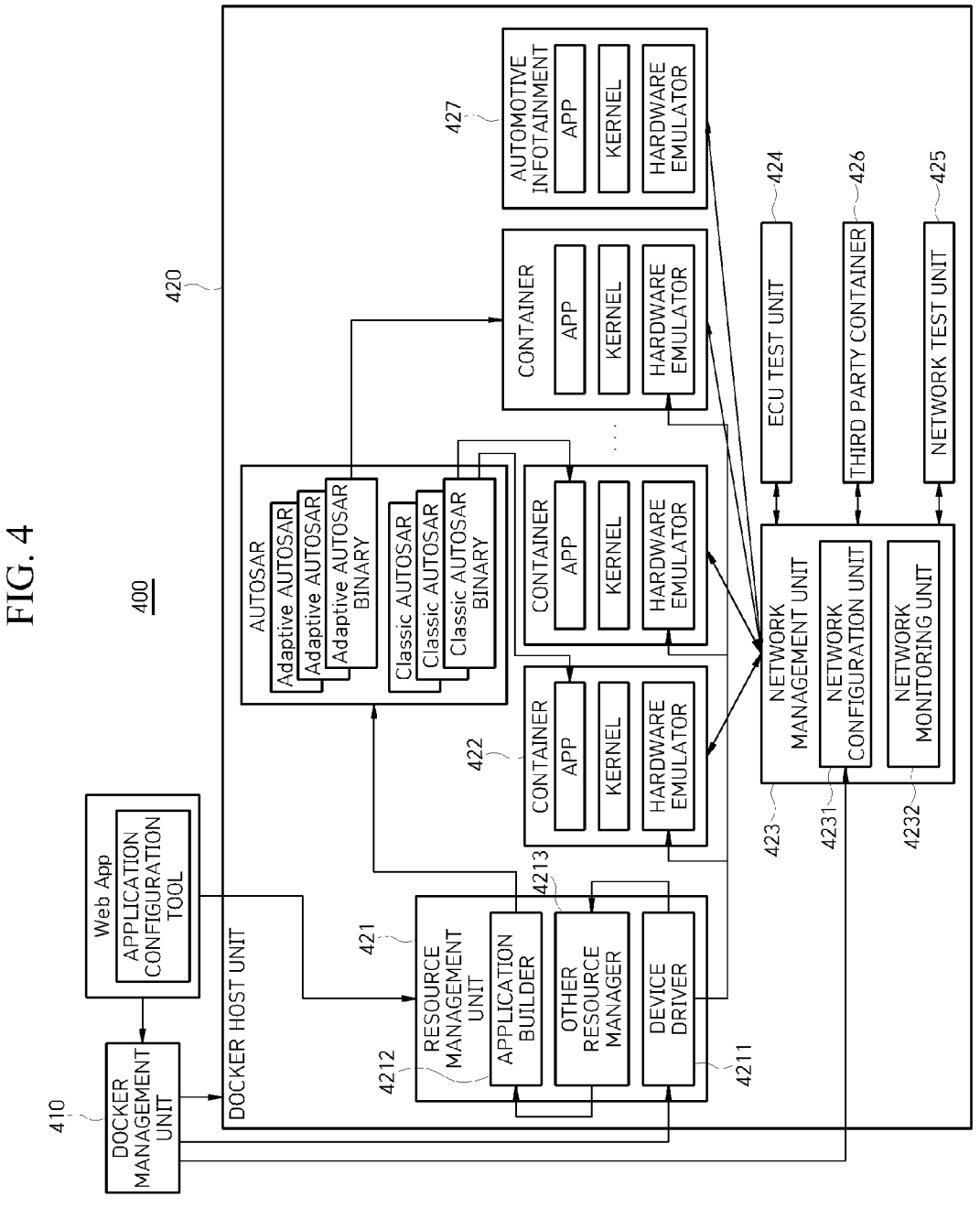
FIG. 4 is a block diagram of a virtual ECU verification system according to an embodiment of the present disclosure.

FIG. 4 is a block diagram of a virtual ECU verification system 400 according to an embodiment of the present disclosure.

The virtual ECU verification system 400 according to an embodiment of the present disclosure includes a docker management unit 410 and a docker host 420.

The docker management unit 410 performs setting for a set of virtual ECUs 422 and setting for a network configuration between the ECUs 422 based on predetermined setting information. That is, the docker management unit 410 performs setting on the plurality of virtual ECUs 422 based on first setting information, and constructs a network between the plurality of virtual ECUs 422 based on second setting information.

As an embodiment, the first setting information is individual setting information of each of the virtual ECUs 422, and may include information on setting for the type of a protocol, an address, a communication speed, and a port. As an embodiment, the second setting information is information on a network configuration between the virtual ECUs 422, and may include information on the connection between the virtual ECUs 422, the type of a protocol, and an address.

As an embodiment, the docker management unit 410 may receive predetermined setting information from an application configuration tool. The application configuration tool may provide the docker management unit 410 with setting information that enables a binary file of embedded software according to the AUTOSAR Classic standard, that is, an automotive embedded software standard, or a binary file of embedded software according to the AUTOSAR Adaptive standard to be generated.

The docker host 420 is managed by the docker management unit 410, and includes a resource management unit 421, the plurality of virtual ECUs 422, and a network management unit 423.

The resource management unit 421 includes a device driver 4211 for each board and an application builder 4212. The device driver 4211 for each board is responsible for controlling a hardware device that is necessary to generate each virtual ECU 422. That is, the device driver 4211 provides an interface suitable for a corresponding board so that an interaction between the virtual ECU 422 and hardware is possible. In other words, an embodiment of the present disclosure may include the device driver 4211 for several boards.

The application builder 4212 is a tool for building an embedded software-based application according to the AUTOSAR standard.

In addition, the resource management unit 421 includes other resource manager 4213 in which resources used in such an operation are collected.

The plurality of virtual ECUs 422 operates as individual containers. The individual container provides an environment in which a built automotive embedded software application is executed, and plays the role of a virtual ECU.

As an embodiment, the set of virtual ECUs means a set of ECUs that have been individually generated. Corresponding hardware of each virtual ECU 422 may be determined based on performance and utilization of a software application. Setting information (i.e., the first setting information) on the set of virtual ECUs may include information on a software application of each ECU and resources and hardware for driving the application.

Each of the virtual ECUs 422 may be constructed based on a set of the device drivers 4211 through the resource manager 421 and information that is received from the docker management unit 410. In this case, the set of device drivers 4211 means a set of device drivers for each board, which is necessary to generate each virtual ECU 422. Furthermore, the information received from the docker management unit 410 may include information on an application of the virtual ECU 422, a message or service for using the application, or hardware of the virtual ECU 422. The virtual ECU 422 capable of emulation may be constructed based on such information. That is, a function and characteristic of each virtual ECU 422 can be constructed in a form in which the function and characteristic can be reproduced in a virtual environment.

A kernel may be generated when the set of virtual ECUs is constructed by the other resource manager 4213. The kernel corresponds to an important factor that provides a runtime environment in which the virtual ECUs 422 are driven in a virtual environment.

Furthermore, an application that is generated through the application builder 4212 is driven in the virtual ECU 422. An embedded software application according to the AUTOSAR standard is built in each virtual ECU 422 through the application builder 4212.

In addition, the virtual ECU verification system 400 according to an embodiment of the present disclosure constructs automotive infotainment 427 as a container so that information according to a change in the state of a vehicle can be displayed or simulations related to a user convenience function can be performed.

The network management unit 423 is connected to the virtual ECUs 422 within the set of virtual ECUs, and supports network communication between the virtual ECUs 422.

As an embodiment, the network management unit 423 includes a network configuration unit 4231 and a network monitoring unit 4232.

The network configuration unit 4231 constructs a virtualized network environment for network communication. The network configuration unit 4231 supports a homogeneous or heterogeneous network communication protocol upon network communication between the virtual ECUs 422, so that data transmitted by using another protocol can be transmitted as data suitable for each virtual ECU 422 according to the homogeneous or heterogeneous network communication protocol.

The network monitoring unit 4232 verifies a virtualized network environment by logging data that are transmitted between the plurality of virtual ECUs 422 to which a plurality of network communication protocols has been applied. In general, when a network between ECUs is verified, whether a response of the ECU to a message that is transmitted over the network is identical with a response that has been determined in a test case is checked. Furthermore, when a problem in communication occurs, messages that have been exchanged over the network need to be analyzed. To this end, the network monitoring unit 4232 may verify a virtualized network environment by logging data that are transmitted and received between the virtual ECUs 422 through a CAN, a LIN, or Ethernet.

As an embodiment, the network monitoring unit 4232 performs a function for relaying the exchange of data between the virtual ECUs 422. That is, when receiving a message from a first virtual ECU, the network monitoring unit 4232 may confirm the destination of data through the network configuration unit 4231, and may transmit the data to a second virtual ECU corresponding to the destination.

In this case, the network monitoring unit 4232 may transmit data that have been transmitted by the first virtual ECU having a first network communication protocol by converting the data into data corresponding to a second network communication protocol applied to the second virtual ECU, based on routing information of the network configuration unit 4231.

For example, if virtual ECUs have different protocols, such as communication between a CAN and Ethernet or CAN FD and Ethernet, there is a need for a task for converting the format of a CAN message into the format of a message to be transmitted through Ethernet. In contrast, if a message is transmitted through Ethernet, the message needs to be transmitted by converting the format of the message into the format of a CAN message. As described above, virtual ECUs perform the exchange of data through the network monitoring unit 4232 for communication between the virtual ECUs. In this case, a service-oriented middleware over IP (SOME/IP) protocol having a structure similar to that of the CAN message in addition to a task for converting the format of the message into the format of the CAN message may be used in Ethernet.

Furthermore, the network monitoring unit 4232 receives information for the exchange of data between the virtual ECUs 422 from the docker management unit 410, and stores the received information. The information may include a messages or service for each virtual ECU 422, or a path for requesting the message or service. The network configuration unit 4231 may transmit a message through a protocol and path suitable for each virtual ECU 422 based on the stored information.

As an embodiment, the network monitoring unit 4232 and the virtual ECU 422 may include a functional mockup interface (FMI) for exchanging simulation models that perform simulations on a test case.

The FMI is a standard for exchanging simulation models (e.g., functional mock-up units (FMUs)) of several tools and vendors. The FMU is an instance for simulating all of ECUs or networks, and provides information, such as an input, a simulation time, and a simulation model for verifying an ECU or network communication. In an embodiment of the present disclosure, an external commercial tool or a self-fabricated test case can be simulated by exchanging the FMUs through the FMI. In this case, the exchanged models may be differently written depending on a target to be simulated. To this end, each ECU and the network monitoring unit supports the FMI so that a test network can be simulated.

As described above, an embodiment of the present disclosure can provide an extended function for performing simulations according to various conditions through direction intervention and the exchange of FMUs by expanding the function of the network monitoring unit 4232, which performs a simple task, such as simply capturing or transmitting a message on a bus in a conventional technology.

In an embodiment of the present disclosure, the network communication protocol, that is, a target, is a communication protocol which may be applied to an ECU within a vehicle. A communication protocol, such as a CAN, LIN, or Ethernet, may be applied to the network communication protocol.

An ECU within an actual vehicle uses various sensors and actuators. In an embodiment of the present disclosure, the sensors and actuators within the vehicle can be simulated in accordance with the ECU.

Furthermore, an embodiment of the present disclosure may include a network test unit 425 and an ECU test unit 424 for testing a network and a virtual ECU.

The network test unit 425 stores and drives a test case for automating a network test between the plurality of virtual ECUs 422.

The network test unit 425 is used to automate a network test between two or more virtual ECUs 422. The network test unit 425 may store and manage the test case. For example, if a network is verified based on a change in the operation of a cluster ECU, a DoorControl ECU, or a BodyInnerLight ECU by imitating an operation of a DoorOpenSensor ECU, the network test unit 425 stores such a scenario as a test case.

Next, the network test unit 425 may perform an automated test by driving the stored test case. In the above example, when a DoorOpen signal is generated, the network test unit 425 propagates the DoorOpen signal to surrounding ECUs. In response to the generation of the DoorOpen signal, a cluster ECU displays a warning of door opening by turning on DoorOpenLed. A DoorControl ECU generates a sound DoorOpenBeep according to the door opening. When the Body_DoorOpenLight_N signal is received, the BodyInnerLight ECU processes the operational results of the Cluster ECU, DoorControl ECU, and itself. It determines whether the DoorOpenLed should be illuminated and whether the DoorOpenBeep should be activated, and then returns these outcomes. In this case, if there is a scenario in which the value of a DoorOpen signal is consistently requested from the DoorOpenSensor ECU, the DoorOpenSensor ECU may verify whether a required operation has been properly performed within a time by measuring the exchange of data between ECUs based on a DoorOpen signal being generated by the DoorOpenSensor ECU and timing at which data are exchanged over a network.

The ECU test unit 424 stores and drives a test case for automating the verification of each virtual ECU 422.

The ECU test unit 424 may store and generate a test case including multiple scenarios for verifying an operation of the virtual ECU 422. The test case includes an input signal that is necessary to verify an operation of the virtual ECU 422, and may be generated through an algorithm of the FMU. Furthermore, if several test cases are present, the ECU test unit 424 may sequentially provide the test cases to the virtual ECU 422 as an input in order to rapidly verify the test cases.

Furthermore, the ECU test unit 424 enables an internal operation of a single virtual ECU 422 to be verified. For example, it is assumed that there is an application for transmitting a detected value of a DoorOpen sensor in a specific ECU to a cluster ECU so that the cluster ECU displays a door opening warning when the value of the DoorOpen sensor is detected (the detected value=1, this means that a door has opened). The ECU test unit 424 may record whether the value of a DoorOpen signal is properly changed into 0 or 1 when repeatedly inputting the value 0 and 1 to the DoorOpen sensor rapidly or randomly providing the value 0 or 1 to the DoorOpen sensor in order to test such an application, and may return such recording.

The ECU test unit 424 compares and analyzes signals that need to be generated within an ECU based on the results of the driving of a test case and the results of an actual test of an ECU, and determines whether the corresponding test case has passed.

In addition, in an embodiment of the present disclosure, the docker host 420 may include a third party container 426 so that tests can be performed through an interoperation with another commercial tool. The third party container 426 supports ASAM XIL MA so that test cases between different tools for verifying the automotive embedded system 400 can be exchanged.

Figure 5:
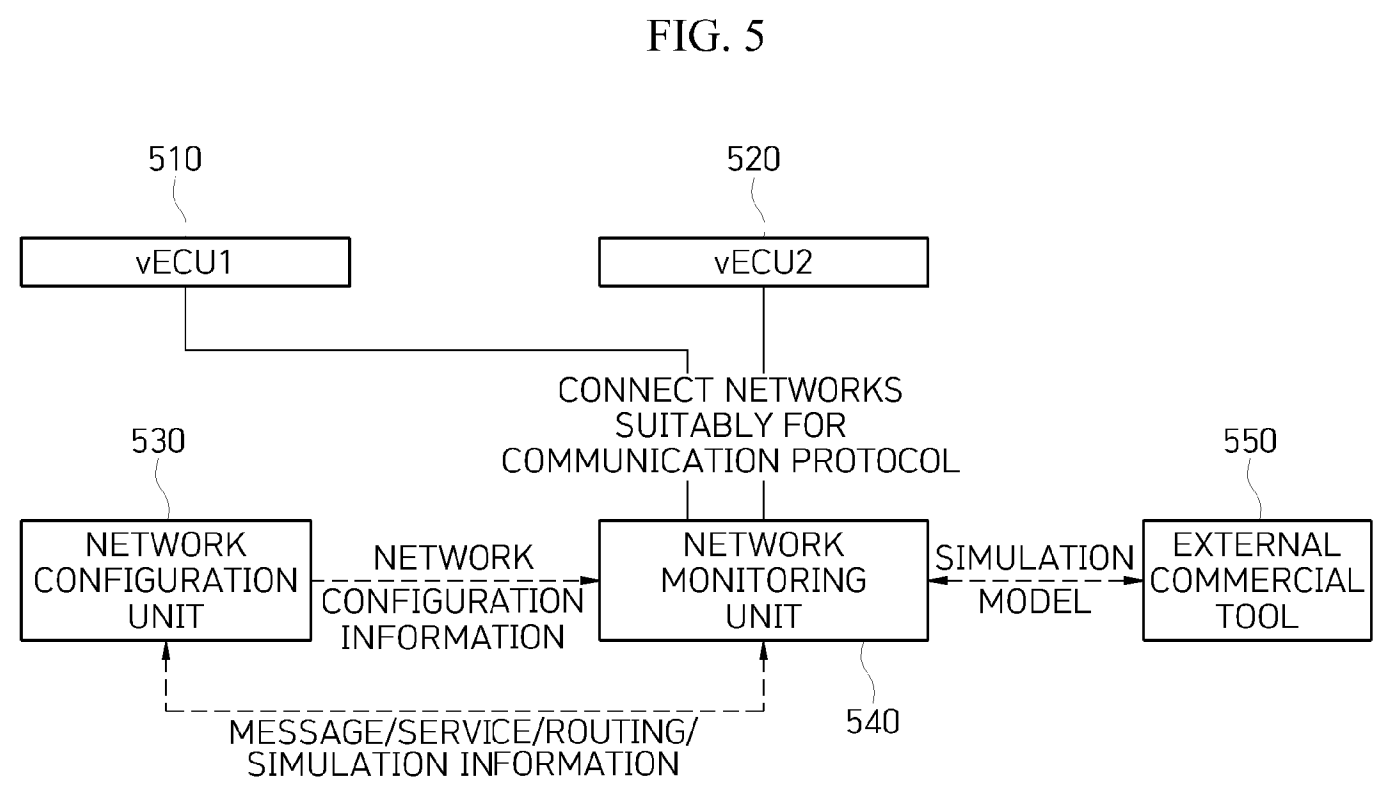

FIG. 5 is a diagram for describing an embodiment in which a virtual ECU is verified in an embodiment of the present disclosure.

In an embodiment of the present disclosure, the information of the docker management unit having the first setting information, that is, setting information related to a virtual ECU, and the second setting information, that is, setting information related to a network configuration, is used to automate a test case.

A virtual ECU is generated by collecting resources and building hardware, which are required to mount an image suitable for each virtual ECU based on the setting information of a set of virtual ECUs. Thereafter, an AUTOSAR application software package that needs to be driven in a corresponding ECU is driven. As described above, all of virtual ECUs that are necessary for a system to be verified may be generated by using the setting information and built application of the virtual ECU.

Furthermore, in setting a network for communication between ECUs, the network configuration unit supports setting so that a connection between the network monitoring unit and each ECU can be performed based on network setting information. Furthermore, the network configuration unit may connect each ECU and the network monitoring unit based on network configuration information.

For example, in communication between virtual ECUs in which a message is transmitted from a virtual ECU1 (vECU1) 510 to a virtual ECU2 (vECU2) 520, when the virtual ECU1 transmits the message to a network monitoring unit 540, the network monitoring unit 540 that has received the message checks routing information of a network configuration unit 530 in order to confirm where should the message transmitted by the virtual ECU1 be transmitted.

In this case, if the protocols of the virtual ECU1 510 and the virtual ECU2 520 are different from each other in the routing information of the network configuration unit 530, the network monitoring unit 540 may check the message and the format of the message based on message information of the network configuration unit 530, may process the message of the virtual ECU1 510 suitably for the protocol of the virtual ECU2 520, and may then transmit the message to the virtual ECU2 520. The network monitoring unit 540 may record, as a log, information on virtual ECUs and messages that are transmitted and received between the virtual ECUs along with a timestamp.

As an embodiment, when receiving simulation information from the network configuration unit 530 and a simulation model from an external commercial tool 550, the network monitoring unit 540 may generate a message corresponding to a specific input to the simulation model, may transmit the message to a virtual ECU, may record a response from the virtual ECU, and may determine whether the recorded response is identical with a response in a test case.

That is, if network simulations are performed between virtual ECUs, the network monitoring unit 540 receives information on whether a network test is available, whether a test for each virtual ECU is available, and a module which may be tested as simulation information from the network configuration unit 530, and receives an FMU that is transmitted by the external commercial tool 550. The network monitoring unit 540 generates a message in response to a specific input to a simulation model based on the information and the FMU, transmits the message to a corresponding virtual ECU, and records a response to the message.

In this case, for the network test between the virtual ECUs, the network monitoring unit 540 transmits the message to the corresponding virtual ECU on which the network test will be performed based on the message and routing information of the network configuration unit 530 by using a received message as a target, receives results returned in response to the transmission of the message, and performs logging on the results.

Thereafter, the network monitoring unit 540 returns the results of the logging of data that are transmitted and received between a plurality of virtual ECUs to the external commercial tool 550 in order to determine the propriety of the results of the logging. The external commercial tool 550 may generate the results of the determination of the propriety by comparing the logging results with the results of simulations for the test case.

Furthermore, in an embodiment of the present disclosure, when receiving a simulation model from the external commercial tool 550 in order to simulate each ECU, the network monitoring unit 540 may transmit the simulation model to a virtual ECU, that is, a simulation target, based on simulation information and routing information, may perform logging on the results of simulations received from the virtual ECU, that is, a simulation target, and may transmit the results of the logging to the external commercial tool 550.

Thereafter, the external commercial tool 550 may generate the results of the determination of the propriety of the results of the logging by comparing the results of the simulations with the results of the simulations according to the test case.

Figure 6:
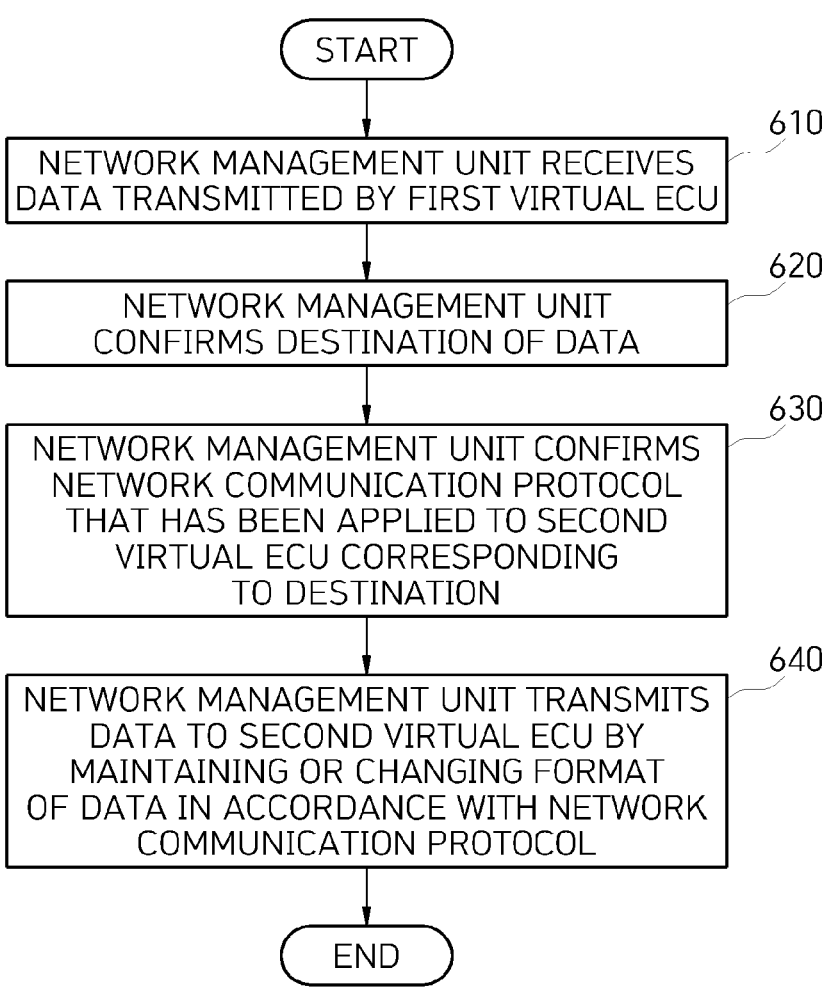
FIG. 6 is a flowchart of a method of verifying a virtual ECU for an automotive embedded system according to an embodiment of the present disclosure.

FIG. 6 is a flowchart of a method of verifying a virtual ECU for the automotive embedded system 300 or 400 according to an embodiment of the present disclosure.

In an embodiment of the present disclosure, first, when receiving data transmitted by a first virtual ECU (610), the network management unit confirms the destination of the data (620).

Next, the network management unit confirms a network communication protocol that has been applied to a second virtual ECU corresponding to the destination (630).

Next, the network management unit transmits the data to the second virtual ECU by maintaining or changing the format of the data to be in accordance with the network communication protocol (640).

In the aforementioned description, steps 610 to 640 may be further divided into additional steps or may be combined into smaller steps depending on an implementation example of the present disclosure. Furthermore, some steps may be omitted, if necessary, and the sequence of steps may be changed. Furthermore, although contents are omitted, contents described with reference to FIG. 3 and the contents described with reference to FIGS. 5 and 6 are mutually applied.

The method of verifying a virtual ECU for an automotive embedded system according to an embodiment of the present disclosure may be implemented in the form of a program (or application) in order to be executed by being combined with a computer, that is, hardware, and may be stored in a medium.

The aforementioned program may include a code coded in a computer language, such as C, C++, JAVA, Ruby, or a machine language which is readable by a processor (CPU) of a computer through a device interface of the computer in order for the computer to read the program and execute the methods implemented as the program. Such a code may include a functional code related to a function, etc. that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The stored medium means a medium, which semi-permanently stores data and is readable by a device, not a medium storing data for a short moment like a register, cache, or a memory. Specifically, examples of the stored medium include a ROM, a RAM, a CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A system for verifying a virtual electronic control unit (ECU) for an automotive embedded system, the system comprising:

a docker management unit configured to perform setting on a plurality of virtual ECUs based on first setting information and to construct a network between the plurality of virtual ECUs based on second setting information; and a docker host managed by the docker management unit, wherein the docker host comprises:

a resource management unit comprising a device driver for each board of a plurality of boards for generating each virtual ECU and an application builder for building an embedded software-based application according to an AUTOSAR standard to be mounted on the virtual ECU;

the plurality of virtual ECUs each configured to drive the built application; and a network management unit connected to the plurality of virtual ECUs and configured to support network communication between the virtual ECUs.

2. The system of claim 1, wherein the network management unit comprises:

a network configuration unit configured to construct a virtualized network environment for the network communication and to support a homogeneous or heterogeneous network communication protocol upon the network communication between the virtual ECUs; and a network monitoring unit configured to verify the virtualized network environment by logging data that are transmitted and received between the plurality of virtual ECUs to which a plurality of network communication protocols has been applied.

3. The system of claim 2, wherein when receiving data that have been transmitted by a first virtual ECU, the network monitoring unit confirms a destination of the data through the network configuration unit and transmits the data to a second virtual ECU corresponding to the destination.

4. The system of claim 3, wherein the network monitoring unit transmits the data transmitted by the first virtual ECU having a first network communication protocol by converting the data into data corresponding to a second network communication protocol that has been applied to the second virtual ECU based on routing information of the network configuration unit.

5. The system of claim 2, wherein the network monitoring unit and the virtual ECU comprise a functional mockup interface (FMI) for exchanging simulation models performing simulations on a test case.

6. The system of claim 5, further comprising:

a network test unit configured to store and drive the test case for automating a network test between the plurality of virtual ECUs, and an ECU test unit configured to store and drive the test case for automating the verification of each virtual ECU.

7. The system of claim 6, wherein when receiving simulation information from the network configuration unit and a simulation model from an external commercial tool, the network monitoring unit generates a message corresponding to a specific input to the simulation model, transmits the message to the virtual ECU, records a response from the virtual ECU, and determines whether the recorded response is identical with a response in the test case.

8. The system of claim 7, wherein:

the network monitoring unit returns, to the external commercial tool, results of logging of data that are transmitted and received between the plurality of virtual ECUs in order to determine a propriety of the results of the logging, and the external commercial tool generates results of the determination of the propriety by comparing the results of the logging and results of the simulations according to the test case.

9. The system of claim 6, wherein:

when receiving a simulation model from an external commercial tool, the network monitoring unit transmits, to the simulation model, the virtual ECU that is a simulation target based on simulation information and routing information, and transmits, to the external commercial tool, results of the simulations received from the virtual ECU that is the simulation target, and the external commercial tool generates results of a determination of a propriety by comparing the results of the simulations with results of simulations according to the test case.

10. A method of verifying a virtual electronic control unit (ECU) for an automotive embedded system, which is performed by a virtual ECU verification system comprising:

a docker management unit configured to perform setting on a plurality of virtual ECUs based on setting information and to construct a network between the plurality of virtual ECUS; and a docker host managed by the docker management unit, the method comprising:

receiving, by a network management unit, data transmitted by a first virtual ECU;

confirming, by the network management unit, a destination of the data;

confirming, by the network management unit, a network communication protocol that has been applied to a second virtual ECU corresponding to the destination; and transmitting the data to the second virtual ECU by maintaining or changing a format of the data in accordance with the network communication protocol, wherein the docker host comprises:

a resource management unit comprising a device driver for each board of a plurality of boards for generating each virtual ECU and an application builder for building an embedded software-based application according to an AUTOSAR standard to be mounted on the virtual ECU;

the plurality of virtual ECUs each configured to drive the built application; and a network management unit connected to the plurality of virtual ECUs and configured to support network communication between the virtual ECUs.

\* \* \* \* \*